(12) United States Patent
Carpenter

(10) Patent No.: US 7,282,167 B2
(45) Date of Patent: Oct. 16, 2007

(54) METHOD AND APPARATUS FOR FORMING NANO-PARTICLES

(75) Inventor: Douglas Carpenter, Tustin, CA (US)

(73) Assignee: QuantumSphere, Inc., Santa Ana, CA (US)

( * ) Notice: Subject to any disclaimer, the term of this patent is extended or adjusted under 35 U.S.C. 154(b) by 445 days.

(21) Appl. No.: 10/840,409

(22) Filed: May 6, 2004

(65) Prior Publication Data

US 2006/0226564 A1 Oct. 12, 2006

Related U.S. Application Data

(60) Provisional application No. 60/529,724, filed on Dec. 15, 2003, provisional application No. 60/568,457, filed on May 4, 2004.

(51) Int. Cl.
*B29B 9/00* (2006.01)
(52) U.S. Cl. .............................. 264/80; 264/5; 264/14; 425/6
(58) Field of Classification Search ............... None
See application file for complete search history.

(56) References Cited

U.S. PATENT DOCUMENTS

| | | |
|---|---|---|
| 4,297,135 A | 10/1981 | Giessen et al. |
| 4,383,852 A | 5/1983 | Yoshizawa et al. |
| 4,596,746 A | 6/1986 | Morishita et al. |
| 4,610,857 A | 9/1986 | Ogawa et al. |
| 4,642,207 A | 2/1987 | Uda et al. |
| 4,654,229 A | 3/1987 | Morita et al. |
| 4,670,332 A | 6/1987 | Werner et al. |
| 4,683,118 A | 7/1987 | Hayashi et al. |
| 4,689,075 A | 8/1987 | Uda et al. |
| 4,705,762 A | 11/1987 | Ota et al. |
| 4,714,047 A | 12/1987 | Ikeda et al. |
| 4,751,070 A | 6/1988 | Verneker |
| 5,128,081 A | 7/1992 | Siegel et al. |
| 7,018,606 B2* | 3/2006 | Tenne et al. ............. 423/561.1 |
| 2002/0197889 A1* | 12/2002 | Nozaki et al. ............. 438/788 |

FOREIGN PATENT DOCUMENTS

EP 0317945 8/1989

OTHER PUBLICATIONS

"Structure and Properties of Nanophase TiO.sub.2", pp. C5-681 to 686, J. De Physiques, C5, Nov. 1, 1988, R. W. Siegal, et al.
"Raman Spectroscopy of Nanophase TiO.sub.2", pp. 1246-1250, J. Material Research, vol. 4, Oct. 1989, C.A. Melendres, et al.
"New Phase of Erbium Oxides", Materials Letters, 6, pp. 342-346, Jun. 1988, Z. Li, et al.

(Continued)

*Primary Examiner*—Mary Lynn Theisen
(74) *Attorney, Agent, or Firm*—Knobbe, Martens, Olson & Bear, LLP

(57) ABSTRACT

Nano-scale particles of materials can be produced by vaporizing the material and allowing the material to flow in a non-violently turbulent manner into thermal communication with a cooling fluid, thereby forming small particles of the material that can be in the nano-scale size range.

73 Claims, 9 Drawing Sheets
(2 of 9 Drawing Sheet(s) Filed in Color)

OTHER PUBLICATIONS

"Processing of Nanophase Ceramics", Ceramic Transaction, 1, pp. 1115-1122, H. Hahn, et al. (Apr. 1988).

"Fractographic Study of Sintered Nanophase $TiO_2$" Materials Letters, 7, pp. 195-201, Z. Li, et al. (Apr. 1988).

"Nanophase Materials", Current Trends in the Physics of Materials, p. 403, R. W. Siegel, et al. (Sep. 1987).

Pesiri, David et al. "Industrial Scale Nano-Aluminum Power Manufacturing", *Journal of Pyrotechnics*, Issue 19, Summer 2004.

* cited by examiner

METHOD AND APPARATUS FOR FORMING NANO-PARTICLES

PRIORITY INFORMATION

This application is based on and claims priority to U.S. Provisional Application No. 60/529,724, filed Dec. 15, 2003, and U.S. Provisional Application No. 60/568,457, filed May 4, 2004, the entire contents of both of which is hereby expressly incorporated by reference.

BACKGROUND OF THE INVENTIONS

1. Field of the Inventions

The inventions disclosed herein relate to the production of nano-sized particles. In particular, the inventions relate to the vaporization and condensation of material for forming nano-sized particles of the material.

2. Description of the Related Art

Techniques for producing nanoparticles generally fall into one of three categories, namely: mechanical, chemical or thermal processing. In mechanical processes, nanopowders are commonly made by crushing techniques such as ball milling. There are several disadvantages to this approach. The grinding media and the mill wear away and combine with the nanomaterial, contaminating the final product. Additionally, nanoparticles produced by ball milling tend to be non-uniform in size and shape and have a wide distribution of particle sizes.

Chemical processes can be used to create nanomaterials through reactions that cause particles to precipitate out of a solution, typically by reduction of organo-metallic materials. Such methods can produce powders contaminated by unreacted materials such as carbon. Additionally, precipitation tends to form large particles and agglomerates rather than nano-scale particles.

Thermal processes utilize vaporization and quenching phases to form nano-scale particles. Such known processes have accomplished vaporization using techniques such as joule heating, plasma torch synthesis, combustion flame, exploding wires, spark erosion, ion collision, laser ablation and electron beam evaporation. Plasma torch synthesis tends to produce particles with a wide distribution of particle sizes as do exploding wire and combustion flame synthesis. Ion collision and electron beam evaporation tend to be too slow for commercial processes. Laser ablation has the disadvantage of being extremely expensive due to an inherent energy inefficiency.

Joule heating has been used in the past to create metal vapors that were condensed to nanomaterials in rapidly flowing turbulent quench gases. This process produces particles with a large size distribution, uses large quantities of gas, and is difficult to scale to commercial bulk production.

SUMMARY OF THE INVENTIONS

An aspect of at least one of the inventions disclosed herein includes the realization that significant improvements in particle size distribution can be achieved by reducing turbulence in the flows of vaporized material and cooling gas. For example, in a thermal-type process for forming nano-scale particles, a reduction in the turbulence of the flow of vaporized material and/or cooling gas allows the vaporized particles to be quenched in a more uniform manner, thereby resulting in better (e.g., narrower) particle size distribution.

One inventive method of producing nano-scale particles comprises the steps of feeding a material onto a heater element so as to vaporize the material, allowing the material vapor to flow upwardly from the heater element in a laminar manner under free convection, injecting a flow of cooling gas upwardly from a position below the heater element, preferably parallel to and into contact with the upward flow of the vaporized material and at the same velocity as the vaporized material, adjusting the flow of cooling gas so as to maintain a laminar flow of the vaporized material and cooling gas, allowing the cooling gas and vaporized material to rise and mix sufficiently long enough to allow nano-scale particles of the material to condense out of the vapor, and drawing the mixed flow of cooling gas and nano-scale particles with a vacuum into a storage chamber.

Another inventive method of producing nano-scale particles comprises the steps of vaporizing a material with a heater device, allowing the material vapor to rise under substantially free convection, and injecting cooling gas into thermal communication with the flow of vaporized material. Other aspects of the inventions herein comprise apparatus and structure arranged and configured to carry out the inventive methods taught herein and variations thereof. Further features and advantages of the present inventions will become apparent to those of skill in the art in view of the detailed description of preferred Embodiments that follows, when such description is considered in conjunction with the attached figures and claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE PREFERRED EMBODIMENTS

The following description and examples illustrate preferred embodiments of the present inventions in detail. Those of skill in the art will recognize that there are numerous variations and modifications of these inventions that are encompassed by its scope. Accordingly, the description of preferred embodiments should not be deemed to limit the scope of the present inventions.

"Quench gas" or "quenchant gas" as used in this specification refers to a gas that has a cooling effect on a material and may, depending upon the ambient conditions, induce a phase change in the material. As used within this specification, the term "substantially laminar" includes generally smooth fluid flows that may be completely laminar as well as flows that include turbulent portions, as described and illustrated below, and flows including incidental or transient eddies. The term "substantially free convection," as used in this specification, includes movement of fluids (including gases) due to energy gradients and completely free convection, but may also include fluid movement that is slightly influenced by a vacuum pump as described herein. The term "chamber" is intended to carry its ordinary meaning and may include without limitation a vessel or container completely or partially enclosing a space, for example, where a gas curtain or other confining means form a wall of the chamber.

Apparatus for Forming Nano-Particles

Figure 1:
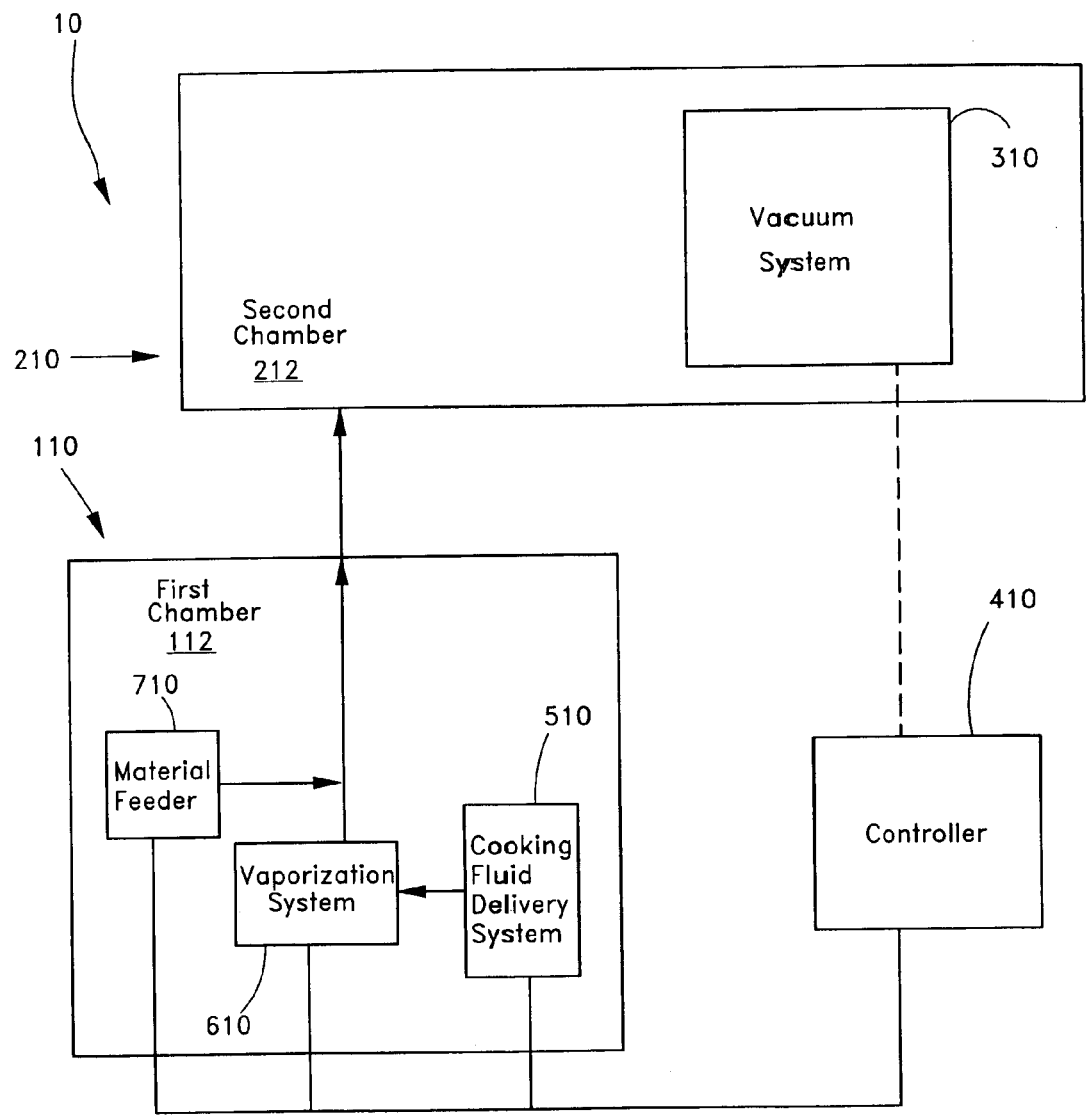
FIG. 1 is a schematic representation of a cross-sectional view of a nano-scale particle generator having a vaporization system, a cooling fluid delivery system, and a collection system.

With reference to FIG. 1, one embodiment of an inventive nano-particle generator 10 comprises a particle generation system 110 and a collection system 210, which can include a vacuum system 310. The generator 10 also preferably comprises a controller 410. With such a nano-scale particle generator 10, particles can be formed by the particle generation system 110, optionally utilizing the vacuum system 310 and the controller 410, and delivered for storage and recovery in the collection system 210. In one embodiment, the particle generation system 110 comprises a first chamber 112, a cooling fluid delivery system 510 for delivering cooling fluid, a vaporization system 610 for vaporizing a material, and a material feeder 710, some or all of which may be included within the first chamber 112. Examples of each of these subsystems are described separately below.

In one embodiment, the material feeder 710 is configured to feed one of any type of vaporizable material, e.g., zinc, into the first chamber 112. The material can be in any form, including by example only powder, pellet, sheet, bar, rod, wire, ingot, and the like. The material feeder 710 is configured to feed the material in the form provided sufficiently close to the vaporization system 610 to cause the material to vaporize. Thus, in one exemplary but non-limiting embodiment, where the material is in wire form, the material feeder 710 can be in the form of a wire-feeder device.

Preferably, the material feeder 710 is configured to feed the vaporizable material at a desired rate. A further advantage is provided where the feed rate of the feeder 710 can be adjusted. For example, where the feeder 710 is a wire-feeder device, the feeder 710 can include a mechanism for adjusting the speed at which the wire is discharged therefrom.

In the first chamber 112, the vaporization system 610 is provided and configured to vaporize the material. The vaporization system 610 can comprise any type of device capable of generating a reduced-turbulence flow of vaporized material. A further advantage is achieved where the vaporization system is configured to produce a smooth, substantially and/or completely turbulence-free flow of vaporized material. Such a vaporization system 610 can comprise, for example, but without limitation, a heater device that can be operated in such a manner that the vaporized material can rise from the device under substantially free convention and/or in a substantially laminar manner.

In one exemplary embodiment, the vaporization system 610 comprises an electrical resistance heater preferably configured to allow material from the feeder 710 to vaporize and emanate from the heater in a smooth flow. For example, but without limitation, the heater and the feeder 710 can be arranged such that the material from the feeder 710 is vaporized by heat from the heater. Because the source of heat, or the outer surface of the heater, is stationary, the flow of vaporized material can flow smoothly away from the heater. Other heater devices can also be configured to provide such a smooth flow of vaporized material. For example, but without limitation, where the source of heat is not stationary, such as with a plasma gun heater device, other devices may be used to smooth the flow of vaporized material, such as a plenum/venturi fluid flow device. The smooth flow of vaporized material can thermally communicate with a cooling fluid from the cooling fluid delivery system 510 with reduced turbulence, and thus, enhanced particle characteristics.

The cooling fluid delivery system 510 is configured to provide a smooth flow of cooling or quenchant fluid (such as, for example, but without limitation, one or any combination of Helium, Hydrogen, Nitrogen, Argon, and the like) that flows into thermal communication with the vaporized material emanating from the vaporization system 610. The cooling fluid supplied from the cooling fluid delivery system 510 can thermally interact with the vaporized material from the vaporization system 610 with reduced turbulence.

A further advantage is provided where the cooling fluid delivery system 510 is configured to direct a flow of cooling fluid generally parallel to and at about the same speed as the vaporized material emanating from the vaporization system 610. This configuration allows the cooling fluid to thermally interact with the flow of vaporized material with reduced turbulence. For example, but without limitation, the cooling fluid delivery system 510 can be configured to direct a flow of cooling fluid upwardly toward the flow of vaporized material emanating from the vaporization system 610, at about the same speed as a stable portion of the flow of vaporized material flowing upwardly from the vaporization system 610. The flow of cooling fluid can flow into thermal communication with the flow of vaporized material without excessively interfering with the smooth convective flow of the vaporized material.

In some embodiments, the controller 410 is configured to obtain feedback from each of the controllable systems as well as to send control information to those systems. Optionally, the controller 410 interfaces with an operator who can input specific information and commands to the controller and controllable systems. The contemplated controller-operator interface can comprise visual displays such as dials, gauges, digital character displays, audio signals, light-emitting diodes, computer screens, liquid crystal displays, etc.

The contemplated controller-operator interface can also include manipulable input devices such as knobs, levers, buttons, switches, keyboards, joysticks, trackballs, mice, touch-screens, etc.

It is contemplated that the controller 410 can be a hard-wired device or one of a plurality of software-based computer routines. Such computer routine(s) can be part of a larger control program or an independent program. The control program can be configured to run on a dedicated processor or a general purpose processor. The controller 410 can be a single independent unit or multiple units. Where the controller 410 comprises multiple units, those units can be dependent upon or independent of each other.

The collection system 210 is optionally configured to capture the particles resulting from the thermally communicating flows of vaporized material and cooling fluid. In one exemplary embodiment, the collection system 210 comprises a chamber connected to the vaporization system 610. Optionally, the vacuum system 310 can be used to generate a fluid flow out of the collection device. For example, but without limitation, the vacuum system 310 can be configured to draw gases from the second chamber 212 and to discharge those gases to the exterior of the second chamber 212. The vacuum can aid in maintaining a smooth flow of particles and cooling fluid from the first chamber 112. The vacuum system 310 can be configured to generate any magnitude of vacuum within the collection system 210. Advantageously, the vacuum system 310 is configured to generate a relatively small vacuum within the collection system 210, such as, for example, but without limitation, a few Torr below the pressure exterior to the collection system 210.

Optionally, the vacuum generated by the vacuum system 310 can be sufficiently large to affect the flow of vaporized material and cooling fluid within the first chamber 112. Preferably, while the vacuum can be used to speed up the flow of cooled particles and cooling fluid from the first chamber 112, the magnitude of the vacuum is limited so as to prevent disturbance of the flow of vaporized material, cooling fluid, and cooled particles flowing upwardly from the vaporization system 610.

Optionally, the collection system 210 can include a nano-particle filter (not shown). The vacuum system 310 can be configured to draw gases from the second chamber 212 through a nano-scale filter so as to minimize or prevent particles from being pulled through the vacuum system 310 and discharged to the atmosphere.

During operation of the generator 10, material is fed by the material feeder 710 to the vaporization system 610. The vaporization system 610 vaporizes the material, causing the vaporized material to flow upwardly from the vaporization system 610 in a reduced-turbulence manner. Preferably, the flow of vaporized material rises from the vaporization system 610 in a substantially laminar flow and/or under substantially free convection and may, in at least one embodiment of generator 10, rise from the vaporization system 610 in the form of a stable plume, similar in shape to that of a candle flame. The cooling fluid is discharged from the cooling fluid delivery system 510 into thermal communication with the flow of vaporized material.

Optionally, cooling fluid is discharged from the cooling fluid delivery system 510 into thermal communication with the flow of vaporized material. Preferably, the cooling fluid is discharged in a manner that does not disrupt the smooth flow of the vaporized material.

As the vaporized material flows away from the heater, individual atoms of the vapor begin to cool and coalesce into multi-atom droplets and/or particles. Because of the surface tension the liquid droplets form almost perfect spheres. As these multi-atom particles or droplets thermally communicate with the cooling fluid, the liquid droplets solidify into solid spherical particles.

The cooling fluid flows into the collection system 210 with the particles entrained within the fluid flow. As this flow enters the second chamber 212, the flow slows thereby allowing the particles to fall out of the moving flow and collect in the second chamber 212. Preferably, the vacuum system 310 is used to generate a low magnitude vacuum within the second chamber 212, so as to enhance the stability and/or continuity of the flow from the first chamber 112 into the second chamber 212.

Figure 2A:
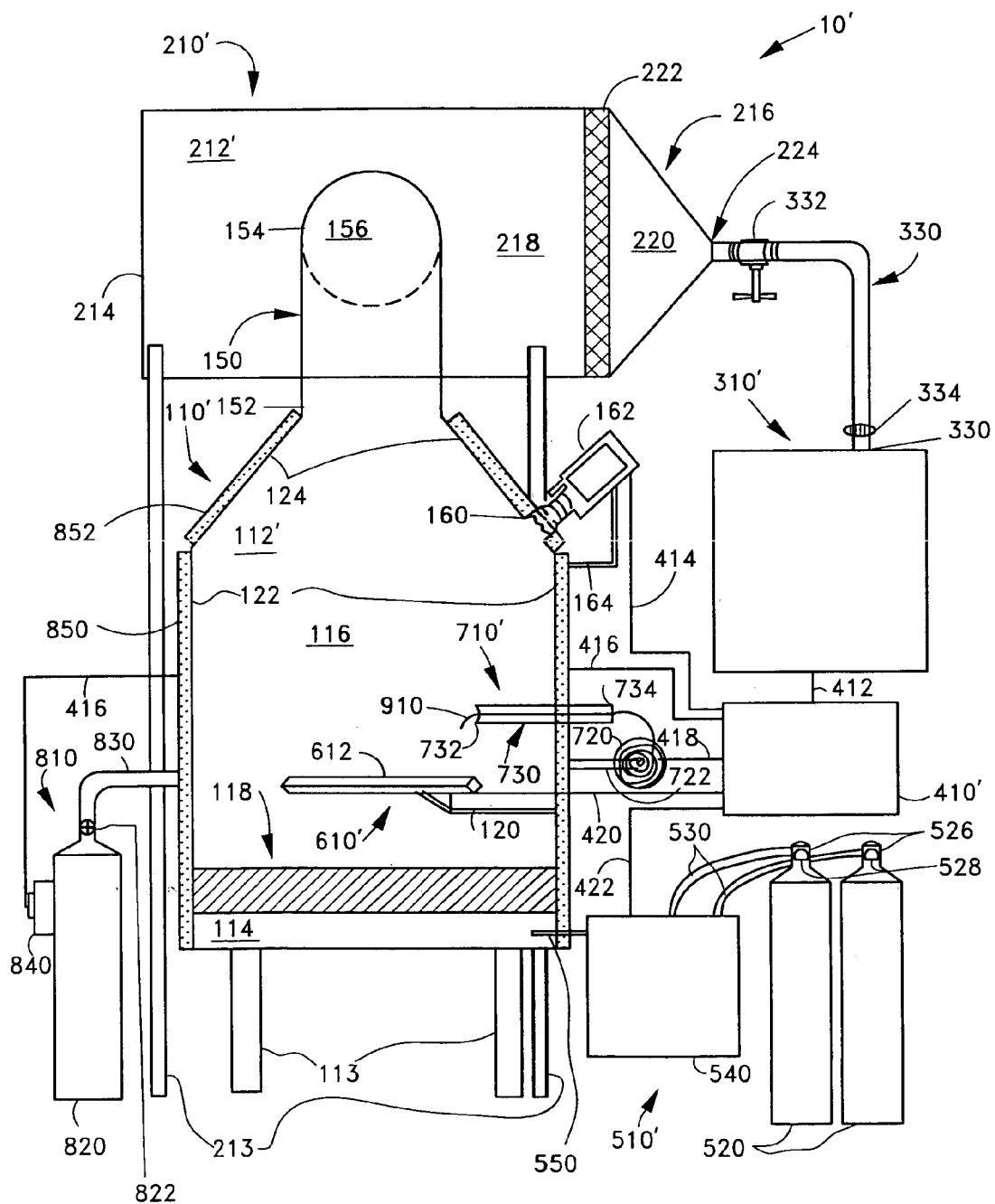
FIG. 2A is a front elevational and partial cross-sectional view of a modification of the nano-scale particle generator illustrated in FIG. 1, a chamber housing portions of the vaporization and cooling fluid delivery systems being shown in section.

With reference to FIG. 2A, another embodiment of the nano-particle generator 10 is illustrated therein and is identified generally by the reference numeral 10' (ten prime). The components of the generator 10' corresponding to the respective components of the generator 10 are identified with the same reference numerals used with respect to the generator 10, except that a prime symbol "'" has been added thereto.

The generator 10' includes a first chamber 112' that defines an enclosure. In the illustrated embodiment, the first chamber 112' is a generally cylindrical metal tank oriented vertically and tapered at the top to generally form a generally frustroconical shape.

As illustrated in FIG. 2A, the first chamber 112' has a lower region 114, and an upper region 116. In this embodiment, the lower region 114 is separated from the upper region 116 by a diffuser 118. Within the upper region 116 are situated a heater device 610' with a supporting strut 120, and a material feeder 710'.

The general shape of one embodiment of the first chamber 112', illustrated in FIG. 2, has a cross-section with generally parallel walls 122. At an upper end of the chamber 112', the sides slope inwardly forming upper walls 124 until they meet a tube 150 that extends upwardly from the top of the first chamber 112'. In this embodiment, the first chamber 112' is generally symmetric about an axis extending from the bottom of the chamber 112' to the top of the chamber where the tube 150 is situated. Optionally, the outer surfaces of the walls 122, 124 of the first chamber 112' are in thermal communication with and generally covered by two cooling jackets, a lower cooling jacket 850, and an upper cooling jacket 852. The cooling system is described below in greater detail.

As illustrated in FIG. 2A, certain embodiments can have a plurality of openings in the first chamber 112', including the tube 150 at the top of the chamber. The lower end 152 of the tube 150 is connected to the upper wall 124 of the first chamber 112' so as to connect the interior of the first chamber 112' to the interior of the second chamber 212'. Preferably, the lower end 152 is connected to the upper wall 124 such that no air or gas can escape the first chamber 112' or the tube 150 at the junction.

In an exemplary but non-limiting embodiment, the first chamber 112' can be manufactured from sheets of metal that have been welded together in the described shape, with any openings sealed shut by welding, gaskets, liquid sealant, or other techniques. In this exemplary embodiment, the first chamber 112' has a width at the base of approximately 3.5 feet and a height of approximately 6 feet from the floor to the lower end 152 of the tube 150. The walls 122, 124 of the first chamber 112' are formed from metal and are sealed so that gas cannot easily penetrate into the chamber 112' from outside or escape from within the first chamber 112'.

Preferably, the first chamber 112' includes a window 160 arranged to allow an operator of the generator 10' to view the vaporization and/or the quenching of vaporized material occurring in the vicinity of the heater device 610'. Optionally, the window can be configured for the insertion or orientation of an instrument for observing the vaporization or quenching during operation. In the illustrated embodiment, the window 160 comprises a transparent panel sealed to the upper wall 124. The described configuration allows an operator to look downwardly and view the vaporization and/or quenching during operation. Optionally, a camera 162 can be used to capture a video image or images of the vaporization and/or quenching during operation. In the illustrated embodiment, the camera 162 is oriented to peer downwardly toward the heater device 610' and capture images of the heater device 610' and the vaporization and quenching of material in the vicinity of the heater device 610'.

Figure 3:
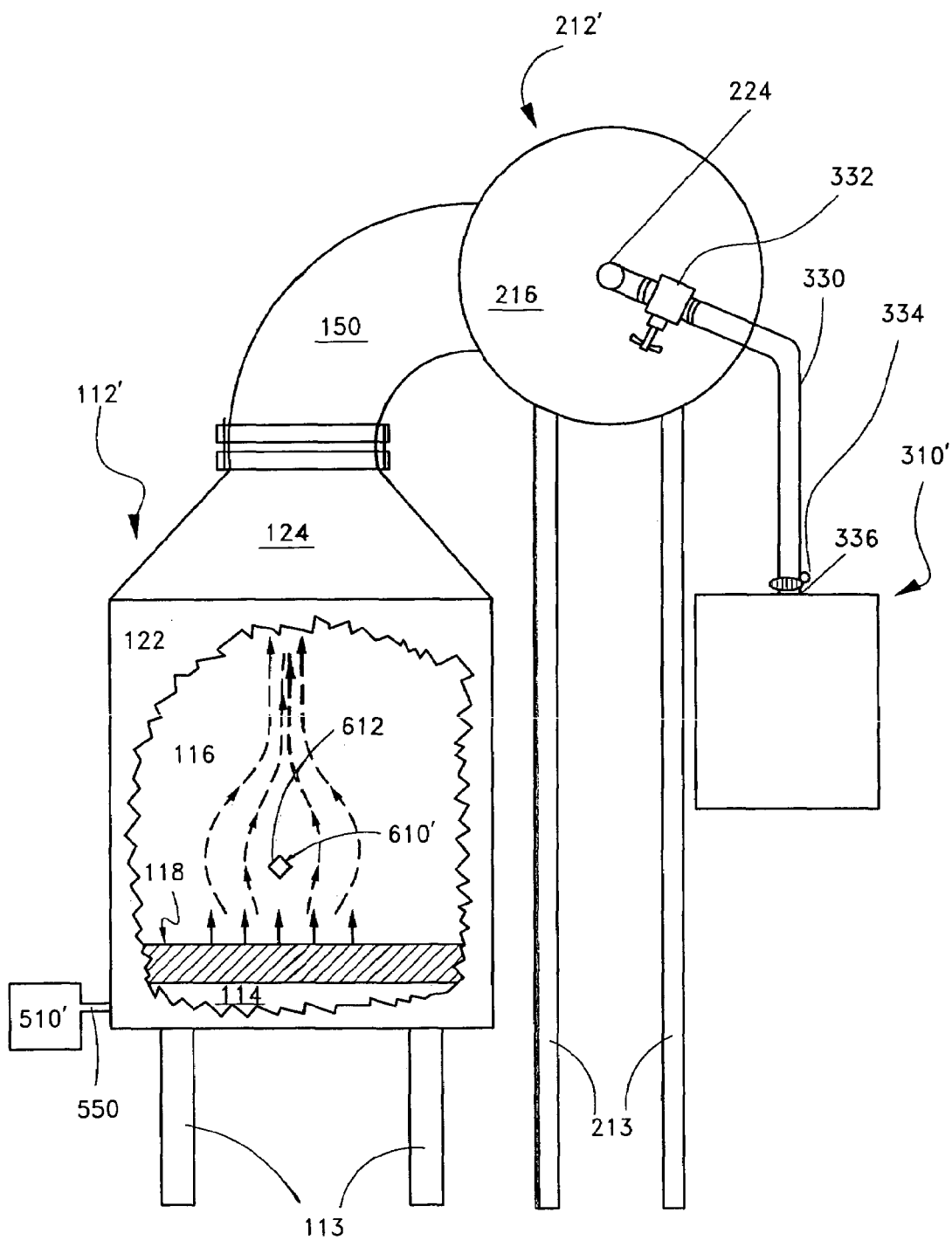
FIG. 3 is a partial cut-away and left side elevational view of the nano-scale particle generator illustrated in FIG. 2.
Figure 6:
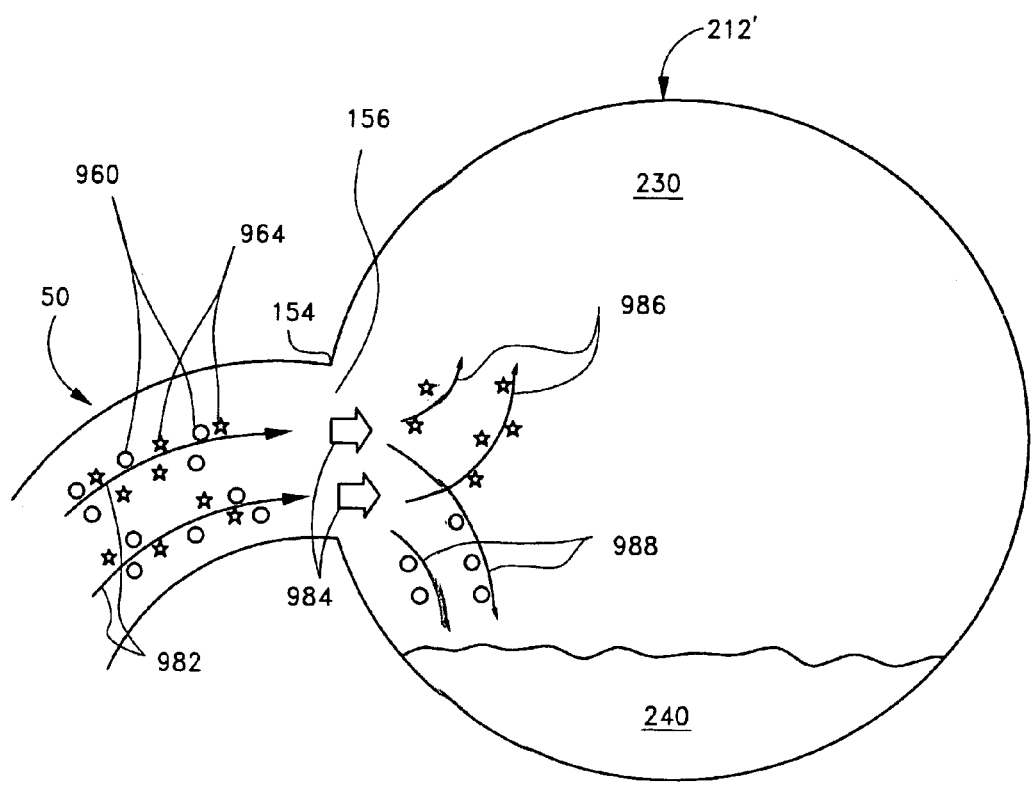
FIG. 6 is an enlarged schematic illustration of a portion of the collection system of FIG. 2, the flow and separation of solidified nano-particles and cooling fluid being represented by arrows, circles, and stars.

With continued reference to FIG. 2A, the second chamber 212' can be a generally cylindrical metal tank, situated generally above and to the side of the first chamber 112', with the two chambers being connected by the tube 150. The tube 150 preferably is metal, although other suitable materials can be used. The second chamber 212' is supported at a height generally above the first chamber 112' by a plurality of legs 213. The legs 213 can be configured to support the second chamber 212' five or six feet above the floor, although other positions can also be used. In the illustrated embodiment, the second chamber 212' can have the same general shape as the first chamber 112'. FIGS. 3 and 6 provide other views of the second chamber 212'. It is contemplated that the second chamber can comprise any suitable container, and can be constructed of the same materials as the first chamber 112', with metal walls and rivets or other fastening devices or techniques used to hold the metal walls together. The second chamber 212' is generally airtight, but has at least two openings, including one to allow the connection of the tube 150 at the end of the tube 154.

Another opening in the second chamber 212' is disposed at a longitudinal end 224 of the second chamber 212', where a tube 330 connects to the second chamber 212'. The tube 330 connects to the second chamber 212' at the longitudinal end 224 thereof. The tube 330 connects the second chamber 212' to the vacuum system 310'. The tube 330 incorporates at least one valve 332, which can be adjusted to regulate the flow of gas through the tube 330. The tube 330 is connected to the second chamber 212' and the vacuum system 310' using pressure fits, including at least one clamp 334 so that gas is not allowed to escape from the two junctures 224, 336.

The second chamber 212' is separated into two regions, 218 and 220A by a filter 222, shown in cross-section inside the second chamber 212' in FIG. 2. The filter is situated generally toward the end 216 of the second chamber 212'. The filter 222 is configured to contact the sides of the second chamber 212', and is placed between the opening where the tube 150 enters the second chamber 212' and the opening where the tube 330 connects to the second chamber 212' so that the filter 222 allows nanoparticles to enter the second chamber 212' but not to escape to the ambient.

In the embodiment illustrated in FIG. 2A, cooling fluid delivery system 510' comprises a source of cooling gas, which, in this embodiment, comprises multiple gas tanks 520 with valves 526 connected to tubes 530 which in turn connect to a mixer 540. The mixer 540 includes a protruding pipe 550. The cooling fluid delivery system 510' is configured to supply gas to be passed through the diffuser 118 and toward the heater device 610'. The pipe 550 penetrates the wall of the first chamber 112'. In this embodiment, the pipe 550 extends from the outside of the first chamber 112' into the lower region 114 of the first chamber 112'. The pipe 550 is configured to guide cooling gas to pass from outside the first chamber 112' into the lower region 114 of the first chamber 112'. Preferably, the pipe 550 does not allow air from outside the system into the first chamber 112', and does not allow gas from inside the first chamber 112' to escape therefrom. The lower region 114 can serve as a "plenum." One alternative embodiment of the diffuser 118 is described below with reference to FIG. 2B.

In one embodiment, the gas tanks 520 can be commercially available metal pressurized gas tanks. The gas tanks 520 have flow regulator valves 526 with knobs 528 that can be turned to decrease or increase the flow of gas from the tank into the connected tubes 530. The tubes 530 are connected to the mixer 540 and the tanks 520 in such a way that gas does not escape and no outside air can penetrate the cooling fluid delivery system 510'. The pipe 550 that connects the mixer 540 with the lower region 114 of the first chamber 112' is connected to the mixer 540 and the first chamber 112' in such a way as to not allow any outside air to penetrate into the nano-particle generator 10', but to allow gas to move from the mixer 540 through the wall 122 of the first chamber 112' into the lower region 114 of the first chamber 112'. It is contemplated that more permanent gas tanks may be used, as for example, for large scale production.

It is contemplated that the cooling fluid delivery system 510' could be a commercially available system or any equivalent known by those of ordinary skill in the art. The cooling gas or gases used can be any pure gas or mixture of inert or reactive gases including, but not limited to, argon, helium, hydrogen, nitrogen, carbon dioxide and oxygen. Materials that can be vaporized at elevated temperatures and/or reduced pressures can also be used as cooling gases.

The diffuser 118 within the first chamber 112' can be any type of commercially available diffuser. Preferably, the diffuser 118 is made from a sintered material such as, for example, but without limitation, stainless steel. The diffuser 118 is configured to allow the cooling gas to move from the lower region 114 to the upper region 116 with a generally uniform flow profile. The described configuration allows the cooling gas to move evenly around the heater device 610' and flow smoothly into thermal communication with a flow of vaporized material emanating from the heater device 610'. A further advantage is provided where the diffuser 118 is larger than the heater device 610'. In such an embodiment, the diffuser 118 can provide a flow of cooling gas that surrounds a flow of vaporized material emanating from the heater device 610', thereby further enhancing the flow of the cooling gas into thermal communication with the flow of vaporized material, described in greater detail below.

In some embodiments, different kinds of cooling gas can be mixed prior to passing through the diffuser 118. For example, if an operator wishes to raise the heat capacity of a mixture of cooling gas, the operator can mix in a second cooling gas that has a higher heat capacity. In this way, the cooling capacity of a desired volume of mixed cooling gases can be raised. Optionally, the cooling gases can be mixed to the desired proportions and stored in a single tank ready for use with the generator 10'. If desired, a mixing device (not shown) can be connected to first and second gas supplies providing first and second cooling gases. Such a mixing device can be configured to mix the first and second gases and continuously supply the mixed gases to the lower portion 114 or the diffuser 118. Such a mixer may be of a type commercially available. For example, in an exemplary but non-limiting embodiment, an MKS brand mixer, such as model no. 247 can be used.

Figure 2B:
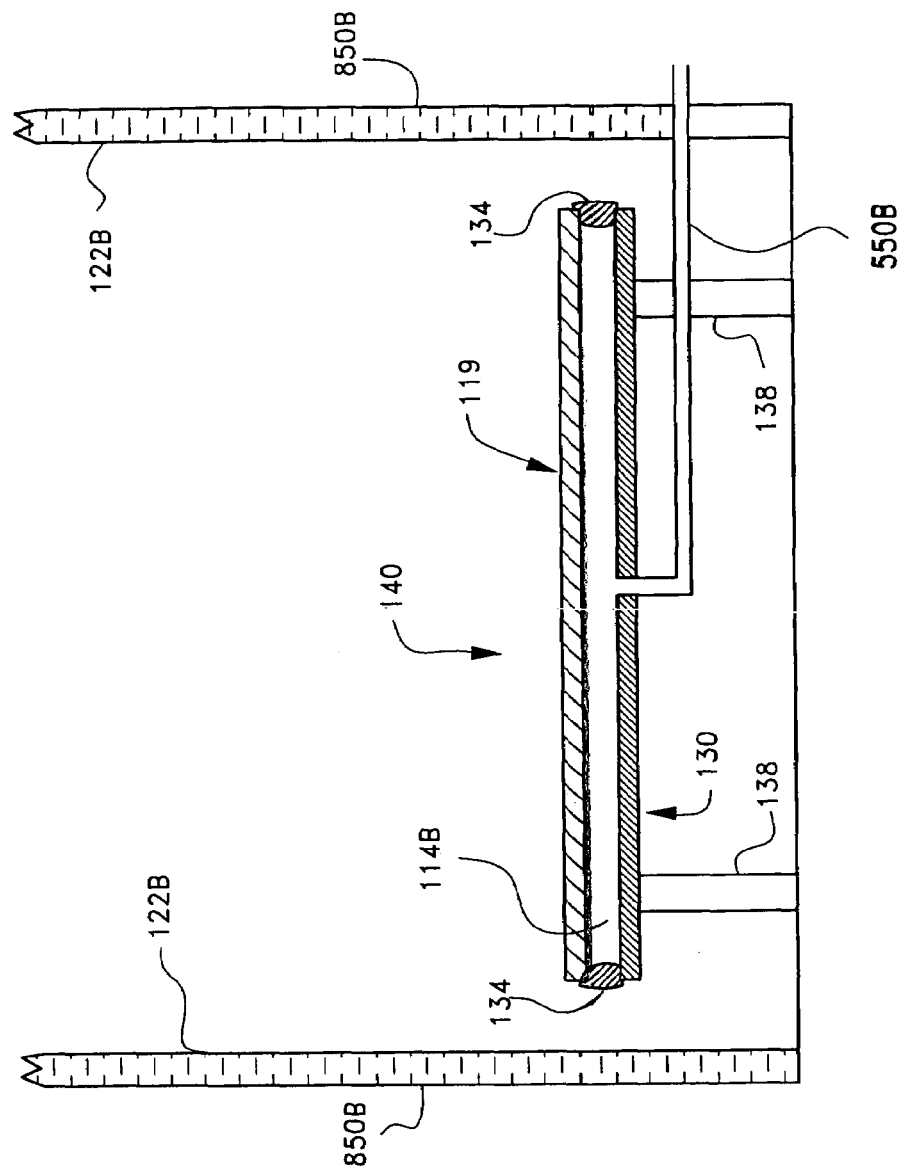
FIG. 2B is an enlarged partial sectional view of the cooling fluid delivery system of FIG. 2.

FIG. 2B illustrates an alternative embodiment of the diffuser 118 of FIG. 2A. FIG. 2B is a cross-sectional view detailing a modification of the diffuser 118, identified generally with the reference numeral 119. The diffuser 119 is configured for diffusing a flow of cooling gas into the first chamber 112'. Components of the diffuser 119 that are the same as the diffuser 118 have been given the same reference numerals, except that a letter "B" has been added.

In this embodiment, the diffuser 119 has a plenum 114B into which the pipe 550B feeds the cooling gas. The plenum 114B can be bounded by a solid metal plate 130 below, and a sintered metal plate 119 above. In an exemplary but non-limiting embodiment, the sides of the diffuser 188B can be comprised of a stainless steel welding rod 134, welded into place. The welding rod serves to hold the two plates and to seal the plenum 114B so that cooling gas can only escape through the sintered metal plate 119. In one embodiment, the diffuser 119 is supported by metal legs 138.

Referring back to FIG. 2A, in a preferred embodiment, a heater device 610' is situated in the upper region 116 of the first chamber 112' and is supported above the diffuser 118, 119. The heater device 610' comprises a heating element 612 supported by two supporting struts 120. In this embodiment, one supporting strut 120 is connected to the side of the first chamber 112' and extends inwardly and the second is connected to the flow of the chamber and extends upward. The struts hold the heating element 612 generally in the upper region 116 of the first chamber 112' and above the diffuser 118.

In an exemplary but non-limiting embodiment, the heating element 612 can be approximately 200 millimeters long. The heating element 612 can be provided with an electrical current that heats the element 612 as the electrical current flows from one end of the element 612 to the other. In one embodiment, the heater device 610' comprises a titanium-diboride heater bar, such as that commercially available from a company known as Advanced Ceramics. Preferably, the heating element 612 is configured to maintain and withstand temperatures sufficient to vaporize the desired material. In an exemplary but non limiting embodiment, the heating element 612 can have a surface temperature of about 500 degrees Celsius and is configured to vaporize zinc. Additionally, the heating element can be of any size, thickness, shape, or length.

Generally, when the heating element 612 vaporizes a material, the vaporized material can flow upwardly in a fluidic flow. If the flow is not meaningfully disturbed, the flow will resemble the shape of the flame of a candle. In one exemplary but non-limiting embodiment, the first chamber 112' is sized so that the flow is allowed to rise above the heater element 612 to a height of about three-times the length of the heater element 612. This provides a further advantage in that there will be sufficient time for the cooling effect of the cooling fluid, described in greater detail below, to achieve a high narrow quality particle size distribution.

In some contemplated embodiments, the heater device 610' comprises a commercially available electrical resistance element heater. The heater device 610' can also be a hollow tube furnace or slot furnace. The material can be any vaporizable material. Advantageously, the material can be any pure metal, oxide or alloy that can be evaporated by the heating source, usually at a low pressure, in the particle generator 10'.

Referring to FIG. 2A, in some embodiments, the material feeder 710' can comprise an access tube 730, with an inner end 732 and an outer end 734. Additionally, the material feeder 710' can further comprise a material feeder device 720 supported by a support member 722 that connects the wall 122 of the first chamber 112' with the material feeder device 720. Preferably, the access tube 730 is configured to allow material 910 to enter the first chamber 112' through the wall 122 of the first chamber 112' without allowing air from outside the first chamber 112' to penetrate the interior of the first chamber 112'. As shown in FIG. 2, the material feeder 710, is positioned higher than the heating element 612 with the inner end 732 of the access tube 730 directly above the heating element 612 such that the material 910, when melted, drips directly onto the heating element 612. The material 910 may comprise metal wire. It is contemplated that the material feeder 710' can comprise any system, commercially available or otherwise, but that in one embodiment the material feeder 710' is configured to feed a thin metal wire through the wall of the first chamber 112' at an adjustable rate.

In another embodiment, the material feeder 710' and the heating element 612 can be combined in function so that the material is melted and flows into the first chamber 112' in a liquid form. It is contemplated that the material can be in any of a number of forms instead of wire, such as ingots or pellets. The material can be any pure metal, oxide or alloy that can be evaporated by the heating element 610.

In the embodiment illustrated in FIG. 2, the vacuum system 310' is a commercially available unit that is connected to the collection system 210' by a tube 330. The vacuum system 310' is located at a distance from the first chamber 112' and the second chamber 212', in part to minimize unwanted vibrations from transferring between the vacuum system 310' and the first chamber 112'. In this embodiment, the vacuum system produces a mild vacuum gently urging the gas within the first chamber 112' and the second chamber 212' to flow upwardly through the diffuser 118 past the heating element 612 through the tube 150 into the second chamber 212' from the first region 218 of the second chamber 212' through the filter 222 into the frustro-conical region 220 of the second chamber 212' through the valve 332 and tube 330 and into the vacuum system 310'. In the current embodiment, the vacuum system 310' is connected to an electrical power grid through an electrical plug. In one embodiment, the vacuum system 310' can be insulated to minimize excessive sound and vibration.

It is contemplated that the vacuum system 310' can comprise any suitable vacuum system, commercially available or otherwise. In one embodiment, the vacuum system 310' is connected to the second chamber 212' by a tube so that the vacuum system slightly reduces the pressure inside the volume of space inside the first chamber 112', the second chamber 212' and the tube connecting the two chambers. Preferably, during operation, the vacuum system 310' draws a volumetric flow rate that is generally equal to the volumetric flow rate of the cooling gas from the diffuser 118. In one exemplary but non-limiting embodiment, the vacuum system 310' can comprise a Leybold-Heraeus D60 roughing pump and RUVAC blower.

In the embodiment illustrated in FIG. 2, a cooling system 810 comprises a coolant tank 820, a pump 840, a valve 822, a tube 830, and two cooling jackets 850 and 852. In this embodiment, a coolant, such as for example, but without limitation, water, is circulated from the water tank 820 by the pump 840 through the tube 830 and the valve 822 into the cooling jackets 850 and 852 and back into the coolant tank 820 through the tube 830 and valve 822. The pump 840 can be connected to and obtain power from an electrical power grid through a conventional electrical power supply.

It is contemplated that the cooling system 810 can comprise any suitable cooling system, commercially available or otherwise. The cooling system 810 can use water, air, sound waves, evaporation, active refrigeration, or any other known method for controlling temperature. In one exemplary but non-limiting embodiment, the cooling system can comprise a commercially available water chiller known as a Neslab HX-300.

In the embodiment illustrated in FIG. 2, a video camera 162 is positioned to gather optical data through the window 160 and is supported by a camera support member 164 that is connected to the outer wall 122 of the first chamber 112'. The angle of the camera 162 is such that the camera 162 can capture video images of the heating element 612, the vaporizing material 910, as well as the quenching of the material 910. The camera 162, in this embodiment, is powered by batteries. In this embodiment, the camera is sensitive to visible light and has a lens with a focal length that can be adjusted by the user. The camera 162 records data on a conventional, commercially available, analog or digital video tape. Other video capturing devices can also be used.

It is contemplated that many alternatives can fulfill the function of the camera 162. Feedback can be provided in real time to the operator through a monitoring screen in communication with the camera 162. A computer can be configured to monitor the status of the first chamber 112' and provide feedback with which to adjust the various systems. The data can be obtained in digital or analog form. The camera can also be sensitive to radiation that is not in the visible range, such as infrared or ultraviolet radiation.

In the embodiment illustrated in FIG. 2, the controller 410' can be a single unit that is electrically or mechanically connected to each of the controllable systems of the generator 10'. The controller 410' can be connected to the vacuum system 310' by a wire 412. The controller 410' can also be connected to the camera by a wire 414. The controller 410' can further be connected to the cooling system 810 and pump 840 by a wire 416. The controller 410' can be connected to the material feeder 710' by a wire 418. The controller can be connected to the heating element 612 by a wire 420. The controller 410' can be connected to the cooling fluid delivery system 510' by a wire 422.

In some embodiments, the controller 410' is configured to obtain feedback from each of the controllable systems as well as send control information to those systems. The controller 410' also interfaces with an operator, who can input specific information and commands to the controller and controllable systems. The contemplated controller-operator interface can comprise visual displays such as dials, gauges, digital character displays, audio signals, light-emitting diodes, computer screens, liquid crystal displays, etc. The contemplated controller-operator interface can also include manipulable input devices such as knobs, levers, buttons, switches, keyboards, joysticks, trackballs, mice, touch-screens, etc.

It is contemplated that the controller 410' can comprise separate control modules, one for each of the controllable systems of the inventions. In other embodiments, the controller can be a single unit configured to communicate with and control each of the controllable systems of the generator 10'. The controllable systems of the generator 10' include, for example, but without limitation, the material feeder 710, the heater device 610', the cooling fluid delivery system 510', the cooling system 810, and the vacuum system 310'.

The controller 410' can comprise a computer system configured to perform the control functions. A computer control system can replace the operator by analyzing feedback data and adjusting the adjustable systems appropriately according to parameters determined concurrently or beforehand.

Method Of Forming Nano-Particles

A method of generating nano-particles can comprise a material feeding process, a material vaporization process, and a cooling process that may comprise an introduction of a flow of cooling fluid to interact with the vaporized material. Optionally, the method can include drawing the vaporized material and cooling fluid using a vacuum system, storing, and collecting the nanoparticles. One exemplary but non-limiting embodiment of a method of producing nanopowders generally comprises the steps of creating a material vapor stream in a first chamber 112' and converting the vapor into nanoparticles using a plume of quenchant gas. Optionally, the method can include adjusting or controlling the speed of the material feeding process, adjusting or controlling the rate of material vaporization, adjusting or controlling the flow of cooling fluid, and adjusting or controlling the vacuum system. Adjustment can be in response to data obtained by a feedback system. Some examples and details of these steps and processes are described above. Further examples and details of each of these steps and processes are described below.

Material Feeding Process

A method for generating nano-scale particles can comprise a material feeding process. The material feeding process can include introducing a raw material into a vaporization system. The raw material can be in solid or liquid form and may comprise ingots, pellets, powder, rods, wire, coils, bars, etc. The material feeding process can comprise advancing the raw material into close proximity with a vaporization system 610 at a controllable rate. Advantageously, the material feeding process can comprise allowing the raw material to flow into a thin layer over a stationary surface of the vaporization system 610 (wetting) before the raw material changes phase into a vapor.

The method can also comprise adjusting the feeding rate of the raw material so as to maintain a desired vaporization rate or a desired thickness of a thin layer of raw material on the heater device 610'. The desired feeding rate can be determined by observing flow of the vaporized raw material and cooling fluid. Advantageously, the method can comprise allowing liquid raw material to flow evenly over the stationary surface of the heater device 610'. Alternatively, the raw material may be allowed to flow over a convex surface of the heater device 610'. The raw material may be allowed to flow over a downwardly facing surface of the heater device, 610'. The feed rate of the raw material may be limited such that only a thin film of raw material forms on the surface of the heater device 610'. The feed rate may be adjusted to limit the thickness of the film so as to minimize the formation of bubbles during the vaporization of the raw material. Optionally, the adjustments can be made by a person who observes the layer of raw material or the flow of raw material onto the heater device 610'. Alternatively, the adjustments can be made automatically by a system that responds to the feeding rate without need for human input. The adjustments can be accomplished through use of a single or multiple controllers 410'. Optionally, the method can comprise adjusting the feed rate of raw material to reduce or increase flow rate and/or turbulence of the flow of material vapor emanating from the heater device 610'.

Figure 4:
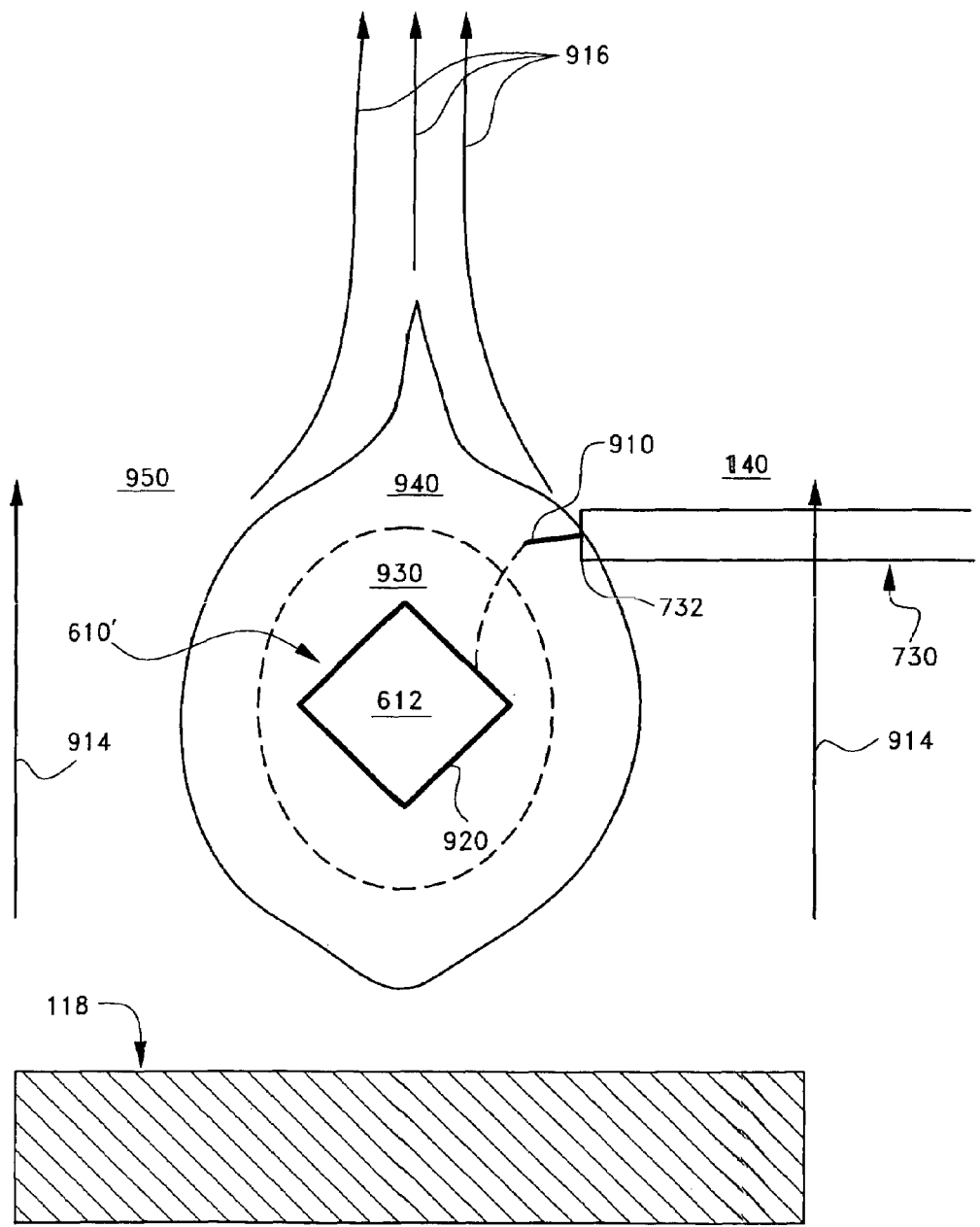
FIG. 4 is an enlarged schematic side elevational view of portions of the vaporization and cooling fluid delivery systems of FIG. 2, vaporized material and cooling fluid flows being represented by arrows.

With reference to FIGS. 2 and 4, in one exemplary embodiment, the material feeder 710' can be activated, including supplying electrical power, such that the material 910 in the form of metal wire is fed from the spool 720 into the outside end 734 of the access tube 730 and moves toward the inner end 732 of the material feeder 710'. The material 910 eventually protrudes into the area 116 of the first chamber 112' just above the heating element 612. As the material 910 is fed through the access tube 730, it is heated by the heating element 612 until shortly after protruding from the end 910 of the access tube 730, the material 910 softens, bends downwardly toward the heating element 612, and melts into liquid form, dripping down onto the heating element 612. The material, upon contacting the heating element 612, quickly forms a thin and continuous layer 920, spreading out over the entire surface of the heating element 612, including the downwardly facing surfaces, and forms a thin, even, liquid layer 920 of material.

Figure 5:
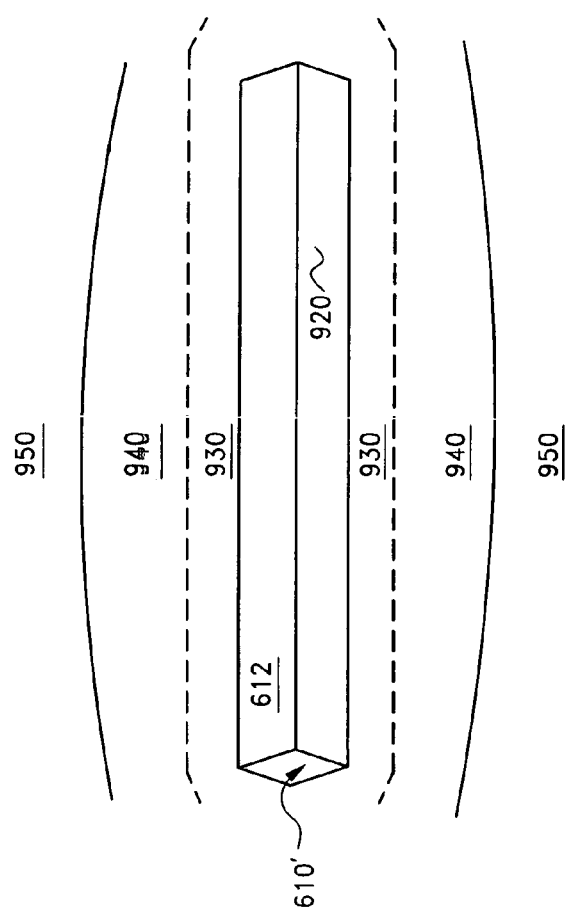
FIG. 5 is a schematic top plan view of a heating element of the vaporization system illustrated in FIG. 4, vaporized material and cooling fluid flows being represented by arrows.

With reference to FIGS. 4 and 5, the thin layer 920 of liquefied material is illustrated as generally adhering to the heating element 612 in such a way that it flows freely along, across, and around the surface of the heating element 612 but without excessive dripping from the heating element 612.

The material 910 can be fed through the access tube 730 at a faster or slower rate, according to the desires of the operator or the parameters of the automated controller. If it is desired to make the layer 920 on the heating element 612 thicker, a higher throughput can be achieved by adjusting the controller 410' appropriately. Pooling of the material on the heating element 612 can be minimized by decreasing throughput of material 910 through the material feeder 710, and the process can be observed using the camera 162. Visually observing a portion of the zone 940 allows feedback and adjustment to be made to achieve desired conditions for nano-particle formation in the vicinity of the heating element 612.

Material Vaporization Process

A method for generating nano-scale particles can comprise a vaporization process. The vaporization process can include heating material until it vaporizes. Optionally, the vaporization process can include the material feeding process. For example, but without limitation, the vaporization process can comprise contacting a stationary surface of a heater device 610' with a raw material. An advantage is provided where the vaporization process includes vaporizing the material with a heater device 610' that does not induce a violently turbulent flow. For example, but without limitation, the heater device 610' may allow vapor to flow upwardly, in a laminar manner, from the heater device 610' under free convection. Optionally, the heater device 610' may allow vapor to emanate or flow away from the device under substantially free convection. Alternatively, the heater device 610' may allow vapor to flow in a substantially laminar manner. Optionally, the vaporization process may occur within a closed or partially enclosed chamber. Advantageously, the vaporization process occurs in conjunction with a material feeder process like that described above, which can supply raw or yet-to-be vaporized material to the vaporization device at an adjustable rate. Advantageously, the material feeding process can comprise allowing the raw material to flow into a thin layer over the stationary surface of a heater device 610' before the raw material changes phase into a vapor. Optionally, the vaporization process can be accomplished by a plurality of heater devices. The heater devices may be disposed in a chamber, spaced from and adjacent to each other. Alternatively, the material vapor can be created by a number of methods including resistance heating, hollow tube furnace heating or slot furnace heating.

The vaporization process can comprise the events described below. The gas molecules of the material separate from the thin liquid layer of material still present on the surface of the heating element 612 and emanate or move outwardly from the heating element 612 into the space surrounding the heating element 612 inside the upper area 116 of the first chamber 112'. This separation of gas phase molecules can be compared to boiling. The vaporized material molecules, in accordance with the principles of physics which govern fluid movement and convection currents, gently rise upwardly through the area 116 of the first chamber 112' toward the tube 150 at the top of the first chamber 112'. The particles in their vaporized, gaseous state have high energy, and they are better able to overcome the constant downward pull of gravity than are the surrounding, cooler molecules in the chamber. Thus, the vaporized material molecules undergo substantially free convection as they move upwardly through the first chamber 112'. This general convective movement of vaporized molecules is illustrated in FIG. 4 with the arrows 916. The general region occupied by the material vapor is illustrated in FIG. 4 as general region 930.

With reference to an exemplary but non-limiting embodiment illustrated in FIG. 4, an end-view of the heating element 612 is shown including a stylized illustration of the thin liquid layer 920 of material. As described above, the material layer 920 is heated by the heating element 612 to the point at which it changes phase from a liquid to a vapor, or gaseous phase. This phase change occurs inside a general zone 930 near the heating element 612, illustrated in FIGS. 4 and 5. Within the zone 930, the material in its vaporized form undergoes nucleation and growth, as the vaporized molecules encounter each other and interact to form nano-scale particles. As the nanoparticles continue to float generally away from the heating element 612 through the zone 930 undergoing nucleation and growth, they enter into a zone 940, where they are more likely to interact with molecules of cooling gas.

Within the zone 940, the nano-sized clusters or groups of material molecules undergo a change of phase from gas to solid. This phase change may be from gas phase directly to solid phase in a process called reverse sublimation, or it may be through phase condensation. The state change results in nano-sized particles of material that in their new solid phase are less likely to adhere to other material particles; thus, the particles are able to retain their distinctive nano-scale size. It is the interaction between cooling gas and vaporized gaseous nano-sized material molecule groups that results in solid phase nano-scale material particles. The cooling fluid process and the interaction between quenchant gas and vaporized particles is described in more detail below.

Figure 7:
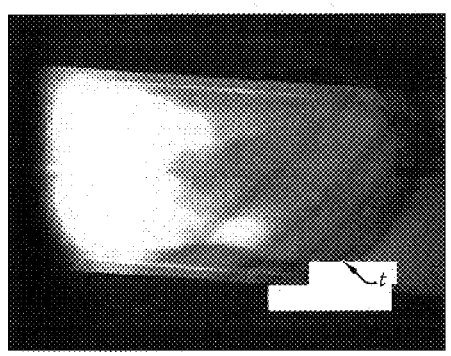
FIG. 7 is a color photograph illustrating a top plan view of a portion of a modified vaporization system in operation and a flow of vaporized material emanating from a heater element of the vaporization system, the flow of vaporized material being cooled by a cooling fluid and rising with some turbulence.

FIG. 7 is a close-up photograph view of the top of the heating element 612 inside the particle generator 10'. The heating element 612 extends laterally through the picture, and the yet-to-be melted or vaporized material is seen as a protruding wire at the right side of the picture. The functioning heating element 612 radiates both heat and light. In this photograph, the heating element 612 is coated with liquid material (zinc) that is undergoing vaporization.

Cooling Process

A method for generating nano-scale particles can also comprise a cooling process. The cooling process can include injecting a flow of cooling fluid upwardly from a position below the vaporization device or heater element. An advantage is provided where the flow of cooling fluid is generally parallel to and in contact with the upward flow of the vaporized raw material. Advantageously, the flow of cooling fluid can be at the same or substantially the same velocity as the flow of vaporized raw material. Advantageously, the flow of cooling fluid can be in thermal communication with the flow of vaporized raw material. Preferably, the cooling fluid is introduced in such a way as to avoid creating a highly turbulent flow. For example, but without limitation, the flow of cooling fluid can be injected so as to create a laminar or substantially laminar flow. The cooling fluid can be any cooling or quenchant fluid, including any pure gas or mixture of inert or reactive gases (such as, for example, but without limitation, one or any combination of Helium, Hydrogen, Nitrogen, Argon, Carbon Dioxide, Oxygen, and the like). Materials that can be vaporized at elevated temperatures and/or reduced pressures can also be used as cooling gases. Those of skill in the art will recognize the wide variety of fluids and fluid mixtures that can be used as quenchant fluids. Optionally, the cooling gas may be injected into a closed chamber, providing the advantage of reducing the chances of ignition or explosion if volatile quenchant fluids are employed. The method can comprise passing the cooling fluid through a diffuser. Optionally, the diffuser comprises one or multiple blocks of sintered stainless steel. Advantageously, the cooling fluid can be introduced into a chamber from a diffuser located below the vaporization device.

Exemplary but non-limiting embodiments of a system for introducing cooling fluid into proximity with vaporized material are illustrated by FIGS. 2, 2B, 3, and 4. With reference to FIGS. 2, 2B, 3, and 4, the stable quenchant gas can be created by a number of methods, such as introduction of gas into the first chamber through one or multiple diffusers 118, 119. Advantageously, such diffusers can be placed near the bottom of the first chamber 112'. For example, in one exemplary but non-limiting embodiment illustrated in FIG. 4, the diffuser 118 through which the cooling gas flows is disposed below the heating element 612. The cooling gas flows upwardly as indicated by the arrows 914. Preferably, the shape and size of the diffuser 118 or diffusers as well as their distance from the source of metal vapor can be configured to generate a smooth flow of quenchant gas. A violently turbulent and/or chaotic plume can lead to broad particle size distributions. Advantageously, the diffusers can be porous sintered metal diffusers.

The method can also comprise adjusting the flow of cooling fluid so as to maintain a laminar or substantially laminar flow of the vaporized raw material and cooling fluid. Optionally, the adjustments can be made by a person who observes the interaction between the vapor and cooling fluid. Alternatively, the adjustments can be made automatically by a system that responds to the flow characteristics without need for human input. The adjustments can be accomplished through use of a single or multiple controllers as described above. Optionally, the method can comprise adjusting the flow of cooling fluid to reduce or increase flow rate and/or turbulence of the cooling fluid. Optionally, the method can comprise adjusting the flow of cooling fluid such that the flow of vaporized raw material rising from the heater device 610' flows generally in the shape of a flame of a candle.

Advantageously, the cooling or quenchant gas is introduced into the diffuser 118 by means of mass flow controllers to precisely meter the flow rate. The size of the nanoparticles produced is determined by, among other things, the heat capacity of the quenchant gas, the chamber pressure, the rate of generation of the material vapor and the flow rate of the quenchant gas. Blending a mixture of Helium, Hydrogen, Nitrogen and/or Argon gases by use of multiple mass flow controllers or a mixing device configured to receive multiple gas flows and mix them together, can control the heat capacity of the quenchant gas. The mixing device can also be configured to control the mass flow of gases into and through the particle generator.

In one exemplary, but non-limiting embodiment, the gas flows from one or a plurality of pressurized gas tanks 520, is released from within the tank(s) through the valves 526 (upon opening of the valves 526 using the knobs 528), and flows outwardly from the pressurized tanks 520 through the tubes 530 into the mixer 540. The two tanks 520 contain two different kinds of gas that are blended and mixed together inside the mixer 540 to achieve desired cooling characteristics. The combined cooling gas is then allowed to pass through the pipe 550 into the lower region 114 of the first chamber 112' and through the diffuser 118, which is formed in one embodiment from porous sintered stainless steel. In this exemplary embodiment, the volumetric flow rate of the cooling gas can be about 1–5 liters per minute.

This lower region 114, as noted above, can also be embodied as illustrated by the plenum 114B in FIG. 2B. The gas is then allowed to travel through the diffuser 118, flowing generally upwardly from the lower region 114 to the upper region 116 of the first chamber 112'. The diffuser 118 causes the flow of cooling gas to be spread out evenly from the surface of the diffuser 118, such that the gas flow does not create violently turbulent currents or eddies and flows in a substantially laminar manner throughout the lower region 114 of the first chamber 112'.

The chamber pressure can be controlled by the vacuum pumps and is also affected by the mass flow of gases in the particle generator 10'. The mass flux of the metal vapor is controlled by the size, geometry and temperature of the heat source and depends on the metal being evaporated. The mass flow controller or controllers can precisely meter the flow rate of the quenchant gas.

As discussed above, and with reference to FIGS. 4 and 5, vaporized material emanates from the heater device 610' to occupy a general zone 930. The vaporized material undergoes convective movement as illustrated by the arrows 916. This vaporization and convective movement are concurrent with the flow of cooling gas described above. For example, while the material layer 920 is being vaporized by the heating element 612, and replacement material 910 continuously fed onto the heating element 612 by the material feeder 710, the operator optionally adjusts the controller 410' to begin or continue the flow of cooling gas from the cooling fluid delivery system 510'.

Particle Formation

The cooling gas and the material vapor described above interact, and this interaction between cooling gas and vaporized gaseous nano-sized material molecule groups results in solid phase nano-scale material particles.

FIG. 4 includes an illustration of the spatial zone 940 where this interaction occurs. The flow of gas is illustrated in FIG. 3, which shows a cutaway view of the inside of the first chamber 112'. The heating element 612 is viewed end-on in FIG. 3 and the flow of gas is indicated by arrows. The gas flow, in this embodiment, is smooth and substantially laminar as the gas flows around and past the heating element 612 and upwardly toward the tube 150.

FIGS. 4 and 5 show the zones of interaction between the vaporized particles of material and the cooling gas in more detail. FIG. 4 shows a close-up, with more detail, of the heating element 612 inside the first chamber 112' shown in FIG. 3. In FIG. 4, the access tube 730 is shown feeding material 910 to the heating element 612.

FIG. 5 shows a top view of the same zones illustrated in FIG. 4. The schematic top view of FIG. 5 is similar to what would be seen by the camera 162 through the window 160 looking downwardly toward the heating element 612. FIGS. 4 and 5 indicate a general zone 950 where the cooling gas is flowing smoothly and generally in a laminar manner upwardly through the first chamber 112'. Arrows 916 in FIG. 4 illustrate the general upward flow of a stream of solid-phase, condensed nano-particles, moving upwardly through free convection combined with the subtle smooth movement of the flowing cooling gas.

As this cooling interaction occurs, the zone 940 is visible to the camera 162 looking through the window 160 of the first chamber 112' due to increased particle size and light from the heating element. It is the zone 940 that is visible as a plume within the first chamber 112', as shown in FIGS. 7 through 10 and illustrated in FIG. 4. The thin material layer 920 and the zones 930 and 940 are not drawn to scale, because they are so variable and often thin that such an illustration would be difficult. FIGS. 7–10 show the visual appearance of the heating element 612 glowing with a glowing ring therearound. The glowing ring corresponds to the zone 940. As shown in FIG. 4, the general zone 940 is visible, and is in the general shape of a candle flame.

FIGS. 7 through 10 illustrate exemplary but non-limiting examples of substantially laminar flows of zinc vapor being quenched with a mixture of hydrogen and helium as viewed through a window positioned above the heater device 610', looking downwardly at the heater device 610'. In addition to spreading out the flow of gas spatially, the diffuser 118 causes the gas to flow at a steady rate in time, with the rate subject to adjustment by the operator using the controller 410'. As the cooling gas flows upwardly through the diffuser 118 and into the upper region 116 of the first chamber 112', it flows around and past the heating element 612 and thermally communicates with the vaporized molecules of material.

Discernible in FIG. 7 are the zones of interaction, illustrated in FIGS. 4 and 5, between the vaporized particles of material and the cooling gas. The photograph shows the plume, or zone 940 generally toward the right of the photograph and enveloping the heating element. The plume is seen from the top and side. Above the heating element 612 in the photograph, the zone 940 is seen to be brighter than the black background. Directly in front of the heating element 612, however, the plume or zone 940 is seen to be generally darker against the backdrop of the glowing heating element. FIG. 7 also illustrates how thin the zone 940 can be in relation to the inner zone 930 and outer zone 950. Because the zone 940 is determined by the interaction between material vapor and cooling or quenchant gas, the visible plume can reveal information about the flow pattern of the cooling gas. In this photograph, the plume includes some minimal turbulence labeled "t" comprising waves, or undulating perturbations in the flow of cooling gas that helps define the zone 940. The flow of cooling gas as exhibited by FIG. 7, including the turbulence "t," is intended to be encompassed by the term "substantially laminar."

Figure 8:
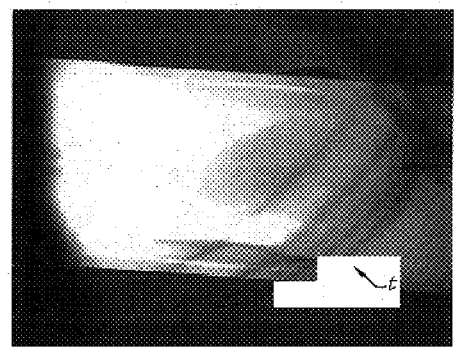
FIG. 8 is another color photograph showing a top plan view of the heater element shown in FIG. 7, in operation.

FIG. 8 shows a similar view to FIG. 7 and was taken at a different time. The flow of cooling gas as exhibited by FIG. 8 is also intended to be encompassed by the term "substantially laminar."

Figure 9:
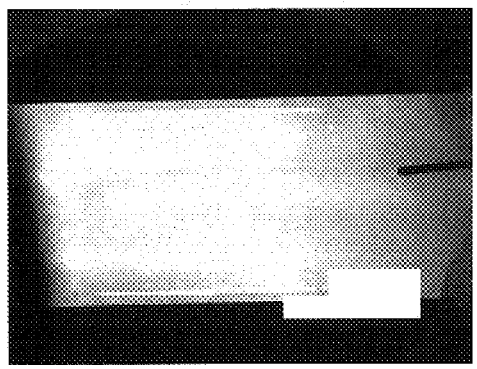
FIG. 9 is a color photograph illustrating another top plan view of the heater in operation and a flow of vaporized material emanating from the heater element, the flow of vaporized material being cooled by a cooling fluid and rising without visually perceptible turbulence.

FIG. 9 shows a similar view to FIGS. 7 and 8, but shows the plume, or zone 940, as seen from directly above, rather than from above and to the side as in FIGS. 7 and 8. In FIG. 9, the flow of cooling gas is coming toward the camera and the candle-flame shape is less discernible. The zone 940 is seen at the perimeter of the photograph as a brighter, rounded, reddish color against the black background. The flow of cooling gas as exhibited by FIG. 9, including the turbulence "t," is also intended to be encompassed by the term "substantially laminar."

Figure 10:
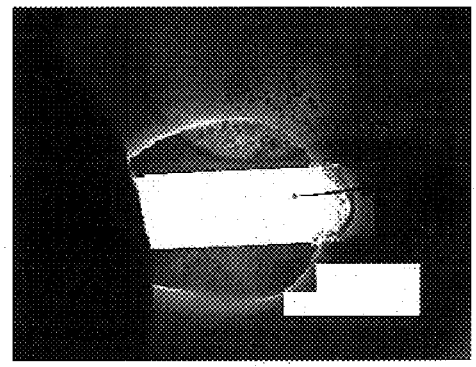
FIG. 10 is a wider angle color photograph of the heater in operation shown in FIG. 9.

FIG. 10 is a photograph of the same heating element as seen in FIGS. 7, 8, and 9, showing the plume, or general zone 940, as seen from farther away than in FIG. 9, but also from above. The zones 930, 940, and 950 as illustrated in FIG. 5 are all seen in FIG. 10. The internal part of the material feeder 710' is also visible at the right of FIG. 10. The flow of cooling gas as exhibited by FIG. 10 is also intended to be encompassed by the term "substantially laminar."

Vacuum, Storing, and Collecting Processes

A method for generating nano-scale particles can also comprise drawing the mixed flow of cooling fluid and nano-scale particles with a vacuum into a collection chamber. Optionally, the cooling gas and vaporized raw material may be drawn from a chamber under a low magnitude vacuum. The method can also comprise adjusting the vacuum system so as to maintain a laminar or substantially laminar flow of the vaporized raw material and cooling fluid. Optionally, the adjustments can be made by a person who observes the interaction between the vapor and cooling fluid. Alternatively, the adjustments can be made automatically by a system that responds to the flow characteristics without need for human input. The adjustments can be accomplished through use of a single or multiple controllers as described above. Optionally, the method can comprise adjusting the vacuum to reduce or increase flow rate and/or turbulence of the cooling fluid. Optionally, the method can comprise adjusting the vacuum system such that the flow of vaporized raw material and cooling fluid flows generally in the shape of a flame of a candle.

In one embodiment, the vacuum system 310' runs concurrently with all the other systems described above. As noted above, the vacuum system 310' can help create a mild flow of gas from the cooling fluid delivery system 510' through the first chamber 112' and second chamber 212', pulling the gas through the filter 222 and ultimately through the tube 330 into the vacuum system 310'. The vacuum system 310' lowers the pressure inside the first and second chambers 112' and 212'. In one exemplary but non-limiting embodiment, the vacuum system 310' lowers the pressure to approximately 1 to 10 Torr below the atmospheric pressure at the location of the particle generator, or approximately 760 Torr at sea level. Thus, the vacuum system 310' gently draws the cooling gas upwardly through the first chamber 112' and tube 150 into the second chamber 212'. In an exemplary but non-limiting embodiment, the flow rate of gas through the vacuum system 310' is about 6 to 10 liters per minute.

FIG. 6 shows a cross-sectional, end-on view of the second chamber 212' where the cross section also cuts through the tube 150. The tube 150 is shown as it enters the second chamber 212' at an opening 156, located at the end 154 of the tube 150. Arrows 982 indicate the direction of flow of the nano-scale particles 960 of solid material as well as the molecules 964 of cooling gas shown as stars in FIG. 6.

The gas molecules 964 and nano-particles 960 flow upwardly from the first chamber 112' through the tube 150 at approximately the same rate, and the gas molecules 964 and nano-particles 960 are entrained together in the flow. Arrows 984 illustrate how the rate of flow changes as the gas molecules 964 and nano-particles 960 go from the smaller cross-sectional volume tube 150 to the larger cross-sectional volume second chamber 212'.

As the rate of flow changes, the gas molecules 964 and the nano-particles 960 separate and the smaller gas molecules float generally upwardly from the opening 156 of the tube 150 into the upper region 230 of the second chamber 212'. In contrast, the nano-particles 960, upon exiting the tube 150 through the opening 156 of the second chamber 212', fall generally downwardly as indicated by arrows 988 into the collection region 240 of the second chamber 212'. The arrows 986 indicate the general upward movement 986 of the gas molecules relative to the general downward movement 988 of the solid material nano-particles 960. The gas molecules 964 do not remain permanently suspended in the upper region 230 of the second chamber 212', but move generally toward and through the filter 222, illustrated in FIG. 2, before moving into the frustroconical region 220 of the second chamber 212' and on into the tube 330 and the vacuum system 310'. The general flow of gas into the vacuum system 310' does not also move the solid material nano-particles 960 once the particles 960 have entered the second chamber 212' because the filter 222 is configured to allow gas molecules through while not allowing nano-particles through. From the nano-particle collection region 240 of the second chamber 212', the nano-particles can be gathered either concurrently while the system is still operating or after the nano-particle formation system has been turned off.

Operation and Adjustment

The method can also comprise adjusting or setting the temperature of the vaporization system or heater device 610' so as to maintain a desired vaporization rate or a desired thickness of a thin layer of raw material on the heater device 610'. The desired temperature can be determined by observing the flow of the vaporized raw material. Optionally, the adjustments can be made by a person who observes the layer of raw material or the flow of raw material into the vaporization system. Alternatively, the adjustments can be made automatically by a system that responds to the temperature without need for human input. The adjustments can be accomplished through use of a single or multiple controllers as described above. Optionally, the method can comprise adjusting the temperature of the heater device 610' to reduce or increase the temperature and/or rate of emanation of material vapor emanating from the vaporization device. Optionally, the method can comprise adjusting the flow of cooling fluid such that the flow of vaporized raw material rising from the heater device 610' flows generally in the shape of a flame of a candle. The method can comprise setting the temperature of the heater device 610' such that the liquid raw material undergoes phase change and is emitted as a vapor generally uniformly from a surface of the heater device 610'.

In an exemplary but non-limiting embodiment, with continued reference to the embodiment illustrated by FIG. 2, one method of using the systems and apparatus described is to first turn on electrical power to the heating element 612 so that the heating element 612 attains a temperature of about 500 degrees Celsius, and begins to give off visible light. Optionally, the camera 162 can be used to capture the appearance of the heater device 610' and/or record the operation thereof. Concurrently, the cooling system 810 can be activated.

Using a described embodiment, viewing the particle formation process through the window 160 of the first chamber 112' allows the operator to adjust the various controllable systems and observe the effect of those adjustments on the size and shape of the zone 940. For example, but without limitation, the gas flow from the cooling fluid delivery system 510' can be adjusted to increase or decrease the flow rate so that the flow of gas matches and is entrained with the upward convection of the vaporized material particles. Also affecting the flow rate of cooling gas is the vacuum system 310' which preferably generates a gentle pressure differential, urging the cooling gas and nano-sized particles to move upwardly through the tube 150 into the second chamber 212'.

The shape of the zone 940 that is glowing and emitting light to the camera 162 can indicate to the operator what kind of particle size and uniformity is being created inside the first chamber 112'. Another controllable system that can be adjusted by the operator is the material feeder 710.

Concurrent with the operation of the material feeder 710, cooling fluid delivery system 510', the activation of the heating element 612, and the operation of the camera feedback system 162, the vacuum system 310' and the cooling system 810 are, in one embodiment, in constant operation. The operator optionally activates these systems either a short time before or a short time after activating the other systems already described. The cooling system 810 continuously pumps water from the water tank 820 through the valve 822 and the tube 830 into the cooling jackets 850 and 852 that are attached to the outer surface of the walls 122 and 124 of the first chamber 112'. The flow of water through the tube 830 is multi-directional as the pump 840 moves cooled water into the cooling jackets and pumps warmer water out of the cooling jackets through the tube 830. The water, once pumped into the cooling jackets 850 and 852, circulates freely throughout the cooling jackets 850 and 852, constantly transferring thermal energy away from the first chamber 112'. The valve 822 can be used to regulate the flow of cooling liquid into and out of the cooling jacket 850 and 852. The valve 822 and the pump 840 can both be controlled and regulated by the controller 410'.

Of course, the foregoing description is that of a preferred particle generator and method for generating particles having certain features, aspects, and advantages in accordance with the present inventions. Various changes and modifications also may be made to the above-described particle generator and method without departing from the spirit and scope of the inventions.

What is claimed:

1. A method of producing nano-scale particles comprising the steps of:

feeding a raw material onto a heater element contained in a sealed chamber so as to vaporize the raw material;

allowing the raw material vapor to flow upwardly, in a laminar manner, from the heater element under free convection;

injecting a flow of cooling gas upwardly from a position below the heater element, parallel to and into contact with the upward flow of the vaporized raw material and at the same velocity as the vaporized raw material;

adjusting the flow of cooling gas so as to maintain a laminar flow of the vaporized raw material and cooling gas;

allowing the cooling gas and vaporized raw material to rise and mix sufficiently long enough to allow nano-scale particles of the raw material to condense out of the vapor; and drawing the mixed flow of cooling gas and nano-scale particles with a vacuum into a collection chamber.

2. A method of producing nano-scale particles comprising the steps of:

vaporizing a raw material with a heater device;

allowing the raw material vapor to rise under substantially free convection; and injecting cooling gas into thermal communication with the flow of vaporized raw material.

3. The method according to claim 2, wherein the step of injecting comprises directing the gas generally parallel to and at a velocity that is approximately the same as a velocity of the raw material vapor.

4. The method according to claim 2, wherein the step of vaporizing is conducted in a chamber.

5. The method according to claim 2, wherein the step of vaporizing comprises contacting the stationary surface of the heater device with the raw material.

6. The method according to claim 5, wherein the step of vaporizing further comprises allowing the raw material to flow into a thin layer over the stationary surface before the raw material changes phase into a vapor.

7. The method according to claim 2 further comprising the step of setting the velocity of the cooling gas such that the combined flow of cooling gas and vaporized raw material is substantially laminar.

8. The method according to claim 2 further comprising the step of allowing the cooling gas and vaporized raw material to flow into thermal communication with each other.

9. The method according to claim 2 further comprising the step of drawing the cooling gas and raw material from the chamber under a low magnitude vacuum.

10. The method according to claim 2 further comprising the step of adjusting the temperature of the heater device and the flow of the cooling gas such that the flow of vaporized raw material rising from the heater device flows generally in the shape of a flame of a candle.

11. The method according to claim 2, wherein the step of vaporizing the raw material comprises contacting the raw material with a stationary surface of the heater device.

12. The method according to claim 11 further comprising the step of allowing liquid raw material to flow evenly over the stationary surface of the heater device.

13. The method according to claim 12 further comprising the step of setting the temperature of the heater device such that the liquid raw material undergoes phase change and is emitted as a vapor generally uniformly from the stationary surface.

14. The method according to claim 2, wherein the step of injecting comprises passing the cooling gas through a diffuser.

15. The method according to claim 2, wherein the step of injecting a flow of cooling gas comprises introducing the cooling gas into the chamber from a position lower than the heater device.

16. The method according to claim 2, further comprising the step of vaporizing additional raw material with a second heater device disposed in the chamber spaced from and adjacent to the stationary heater device.

17. A method of producing nano-scale particles comprising the steps of:

introducing a raw material into a chamber;

vaporizing the raw material with a first heater device so as to generate a flow of vaporized raw material from the first heater device; and injecting a cooling gas into the thermal communication with the flow of vaporized raw material so as to form a substantially laminar flow of cooling gas and vaporized raw material.

18. The method according to claim 17 further comprising the step of drawing the flow of cooling gas and raw material from the chamber under vacuum.

19. The method according to claim 17 further comprising the step of adjusting a temperature of the first heater device and the flow of the cooling gas such that the flow of vaporized raw material rising from the first heater device flows generally in the shape of a flame of a candle.

20. The method according to claim 17, wherein the step of contacting the raw material further comprises allowing liquid raw material to spread evenly along a stationary surface of the first heater device.

21. The method according to claim 20 further comprising the step of setting the temperature of the first heater device such that the liquid raw material undergoes phase change from liquid to vapor and is emitted as a vapor generally uniformly from the stationary surface.

22. The method according to claim 17, wherein the step of injecting comprises introducing the cooling gas into the chamber from a position lower than the first heater device.

23. The method according to claim 17, wherein the step of injecting a flow of cooling gas comprises passing the cooling gas through a diffuser.

24. The method according to claim 17, wherein the step of injecting a flow of cooling gas comprises passing the cooling gas through a block of sintered stainless steel.

25. The method according to claim 17 further comprising the step of vaporizing additional raw material with a second heater device disposed in the chamber spaced from and adjacent to the first heater device.

26. A method of forming nano-scale particles comprising the steps of:

contacting a raw material with a surface of a heater;

allowing the raw material to flow over the surface so as to form a thin film of raw material;

vaporizing the thin film of material; and cooling the vapor so as to form nano-scale particles.

27. The method according to claim 26, wherein the step of vaporizing comprises conducting heat into the raw material through the surface of the heater.

28. The method according to claim 26, wherein the step of allowing the raw material to flow over the surface so as to form a thin film of raw material comprises allowing the raw material to flow over a convex surface of the heater.

29. The method according to claim 26, wherein the step of allowing the raw material to flow over the surface so as to form a thin film of raw material comprises allowing the raw material to flow over a downwardly facing surface of the heater.

30. The method according to claim 26 further comprising limiting a feed rate of raw material to the heater surface such that only a thin film of raw material forms on the surface of the heater.

31. The method according to claim 30, wherein the step of limiting a feed rate of raw material further comprises limiting the thickness of the film so as to minimize the formation of bubbles during the vaporization of the raw material.

32. The method according to claim 31, wherein the step of limiting a feed rate of raw material further comprises preventing bubbles from forming in the raw material during the vaporization of the raw material.

33. A nano-scale particle generator comprising a first heating device disposed in the chamber and configured to vaporize a raw material; and a cooling gas source configured to direct a flow of cooling gas into thermal communication with a flow of raw material vapor emanating from the first heating device under substantially free convetion, wherein the cooling gas source is further configured to direct the flow of cooling gas upwardly and generally parallel to the flow of raw material.

34. The generator according to claim 33, wherein the cooling gas source is further configured to direct the flow of cooling gas at a speed about the same as a speed of the flow of raw material vapor.

35. The generator according to claim 33 additionally comprising a vacuum device connected to an upper portion of the chamber and configured to draw cooling gas and nano-scale particles of the raw material from the chamber.

36. The generator according to claim 33, wherein at least one of the first heater device and the cooling gas supply are configured to allow the raw material vapor and cooling gas to rise above the first heater device in a substantially laminar flow.

37. The generator according to claim 33 additionally comprising a diffuser disposed at a position below the first heater device.

38. The generator according to claim 37, wherein the diffuser comprises sintered stainless steel.

39. The generator according to claim 37, wherein the diffuser is configured to generate an upward flow of cooling gas being substantially uniform around the first heater device.

40. The generator according to claim 33, wherein the first heater device is configured to allow the raw material to flow, in a liquid state, substantially evenly over a stationary surface of the first heater device.

41. The generator according to claim 40, wherein the first heater device is further configured to transfer sufficient heat through the stationary surface into the liquid raw material to cause the liquid raw material to vaporize.

42. The generator according to claim 41, wherein the stationary surface is configured to transfer heat into the liquid raw material so as to cause vaporization of the liquid raw material at a substantially uniform rate over the stationary surface.

43. The generator according to claim 33, wherein the first heating device is configured to prevent disruption of the flow of raw material vapor emanating therefrom.

44. The generator according to claim 33 additionally comprising a second heating device disposed in the chamber and configured to vaporize additional raw material.

45. The generator according to claim 44, wherein the second heating device disposed in the chamber is spaced from and adjacent to the first heating device.

46. A nano-scale particle generator comprising:
a first heating device configured to vaporize a raw material and generate a substantially laminar upward flow of vaporized raw material; and
a cooling gas source configured to direct a flow of cooling gas into thermal communication with a flow of raw material vapor emanating from the first heating device.

47. The generator according to claim 46 additionally comprising a chamber, the first heating device being disposed in the chamber.

48. The generator according to claim 46, wherein the cooling gas source is further configured to direct the flow of cooling gas upwardly and generally parallel to the flow of raw material vapor.

49. The generator according to claim 46 additionally comprising a vacuum device connected to an upper portion of the chamber and configured to draw cooling gas and nano-scale particles of the raw material from the chamber.

50. The generator according to claim 46, wherein at least one of the first heater device and the cooling gas supply are configured to allow the raw material vapor to rise above the first heater device under substantially free convection.

51. The generator according to claim 46 additionally comprising a diffuser disposed at a position below the first heater device.

52. The generator according to claim 51, wherein the diffuser comprises sintered stainless steel.

53. The generator according to claim 52, wherein the diffuser is configured to generate an upward flow of cooling gas being substantially uniform around the first heater device.

54. The generator according to claim 46, wherein the first heater device is configured to allow the raw material to flow, in a liquid state, substantially evenly over a stationary surface of the first heater device.

55. The generator according to claim 54, wherein the first heater device is further configured to transfer sufficient heat through the stationary surface into the liquid raw material to cause the liquid raw material to vaporize.

56. The generator according to claim 55, wherein the stationary surface is configured to transfer heat into the liquid raw material so as to cause vaporization of the liquid raw material at a substantially uniform rate over the stationary surface.

57. The generator according to claim 46, wherein the first heating device is configured to prevent disruption of the flow of raw material vapor emanating therefrom.

58. The generator according to claim 46 additionally comprising a second heating device disposed in the chamber and configured to vaporize additional raw material.

59. The generator according to claim 58, wherein the second heating device is spaced from and adjacent to the first heating device.

60. A nano-scale particle generator comprising:
a raw material supply configured to discharge a raw material at a first feed rate;
a first heater having at least a first surface configured to heat the raw material from the raw material supply to a temperature sufficient to cause the raw material to flow into a thin layer over the first surface and to vaporize the raw material.

61. The generator according to claim 60, wherein the first heater is configured to limit the depth of the thin layer so as to minimize bubble formation during vaporization of the raw material.

62. The generator according to claim 60, wherein at least one of the first feed rate and the temperature is configured to limit the depth of the thin layer so as to minimize bubble formation during vaporization of the raw material.

63. The generator according to claim 60, wherein the depth of the layer prevents bubble formation during the vaporization of the raw material.

64. The generator according to claim 60, wherein the first surface is configured to emit vaporized raw material substantially uniformly therefrom.

65. The generator according to claim 60, wherein the first surface is configured to emit a substantially laminar flow of vaporized raw material.

66. The generator according to claim 60 further comprising a chamber and a first cooling gas source, the first heater and the first cooling gas source being disposed in the chamber.

67. The generator according to claim 66, wherein the cooling gas source is configured to direct a flow of cooling gas into thermal communication with vaporized raw material emitted from the first heater.

68. The generator according to claim 67 further comprising a vacuum source configured to draw raw material particles and cooling gas out from the chamber under a vacuum.

69. The generator according to claim 68, wherein the chamber, the cooling gas source, and the vacuum are configured to allow the vaporized raw material to rise under substantially free convention.

70. The generator according to claim 60 further comprising a chamber and second heater configured to vaporize raw material, the first and second and the third heaters being disposed in the chamber.

71. A nano-scale particle generator comprising:
a first heater having at least a first downwardly-facing surface configured to vaporize a raw material; and
a raw material supply configured to supply the raw material to at least the first surface of the heater;
wherein the first heater is configured to heat the raw material from the raw material supply to a temperature sufficient to cause the raw material to flow into a thin layer over the first surface.

72. A nano-scale particle generator comprising:
a chamber;
a first heating device disposed in the chamber and configured to vaporize a raw material;
a cooling gas source configured to direct a flow of cooling gas upwardly and generally parallel to and into thermal communication with a flow of raw material vapor emanating from the first heating device; and
means for maintaining a substantially laminar flow of cooling gas and raw material vapor.

73. A nano-scale particle generator comprising:
a chamber;
a first heating device disposed in the chamber and configured to vaporize a raw material;
a cooling gas source configured to direct a flow of cooling gas upwardly and generally parallel to and into thermal communication with a flow of raw material vapor emanating from the first heating device; and
means for maintaining the flow of raw material vapor under substantially free convection.

* * * * *